United States Patent [19]
Wilson

[11] Patent Number: 4,901,600
[45] Date of Patent: Feb. 20, 1990

[54] MANUAL CONTROL FOR EXTENDED RANGE SPLITTER TYPE COMPOUND TRANSMISSION

[75] Inventor: Derek R. Wilson, Bolton, England
[73] Assignee: Eaton Corporation, Cleveland, Ohio
[21] Appl. No.: 262,419
[22] Filed: Oct. 25, 1988
[30] Foreign Application Priority Data
Nov. 14, 1987 [GB] United Kingdom ............... 8726712
[51] Int. Cl.⁴ .......................... F16H 3/02; F16H 3/08
[52] U.S. Cl. ....................................... 74/745; 74/331; 74/363; 74/365
[58] Field of Search ............... 74/745, 331, 333, 357, 74/358, 359, 360, 335, 336 R, 363, 365

[56] References Cited
U.S. PATENT DOCUMENTS

| | | | |
|---|---|---|---|
| 3,046,807 | 7/1962 | Barth et al. | 74/333 X |
| 4,152,949 | 5/1979 | Vandervoort et al. | 74/360 X |
| 4,275,612 | 6/1981 | Silvester | 74/475 X |
| 4,373,409 | 2/1983 | Benedek et al. | 74/745 |
| 4,455,883 | 6/1984 | Radcliffe | 74/475 |
| 4,485,692 | 12/1984 | Moore et al. | 74/745 |
| 4,527,447 | 7/1985 | Richards | 74/331 X |
| 4,561,325 | 12/1985 | Jester | 74/745 |
| 4,633,725 | 1/1987 | Jones | 74/745 X |
| 4,735,109 | 4/1988 | Richards et al. | 74/745 |
| 4,754,665 | 7/1988 | Vandervoort | 74/745 |
| 4,788,889 | 12/1988 | Davis et al. | 74/745 |

FOREIGN PATENT DOCUMENTS 728878 4/1955 United Kingdom ............... 74/745

OTHER PUBLICATIONS

"The New Rt-910 10-Speed Roadranger and Family of Twin Countershaft Transmissions", Fuller Transmission Division, Eaton Manufacturing Company.

Primary Examiner—Dwight G. Diehl
Assistant Examiner—Chris Campbell
Attorney, Agent, or Firm—H. D. Gordon

[57] ABSTRACT

A control for an extended range splitter type compound transmission (10) comprising a main transmission section (12) connected in series with a splitter type auxiliary transmission section (14) connected in series with an extended range section (15) is provided. The main section shift lever (72) has a first (1) and a second (1E) position for selection of low ratio (50). Selection of the second position (1E) will automatically cause the extended range section clutch (206) to be shifted to the speed reduction position thereof.

17 Claims, 9 Drawing Sheets

| GEAR | NORMAL | DIRECT EXTENDED | % STEP | OVERDRIVE NORMAL | EXTENDED | % STEP |
|---|---|---|---|---|---|---|
| 1 | | 17.94 | 22 | | 14.65 | 22 |
| 2 | | 14.72 | 22 | | 12.02 | 22 |
| 3 | | 12.03 | 25 | | 9.82 | 25 |
| 4 | 9.64 | | 22 | 7.88 | | 22 |
| 5 | 7.91 | | 22 | 6.47 | | 22 |
| 6 | 6.47 | | 28 | 5.29 | | 28 |
| 7 | 5.03 | | 22 | 4.11 | | 22 |
| 8 | 4.13 | | 22 | 3.38 | | 22 |
| 9 | 3.38 | | 24 | 2.76 | | 24 |
| 10 | 2.72 | | 22 | 2.22 | | 22 |
| 11 | 2.23 | | 22 | 1.82 | | 22 |
| 12 | 1.82 | | 22 | 1.49 | | 22 |
| 13 | 1.49 | | 22 | 1.22 | | 22 |
| 14 | 1.22 | | 22 | 1.00 | | 22 |
| 15 | 1.00 | | | 0.82 | | |
| REV | | | | | | |
| LO | | 16.61 | | | 13.56 | |
| INT | | 13.63 | 22 | | 11.13 | 22 |
| HI | | 11.14 | 22 | | 9.09 | 22 |
|  | | | 25 | | | 25 |
| LO | 8.93 | | 22 | 7.30 | | 22 |
| INT | 7.32 | | 22 | 5.99 | | 22 |
| HI | 5.99 | | | 4.90 | | |

*Fig. 8*

| GEAR | NO. OF TEETH | |
|---|---|---|
| | DIRECT | OVERDRIVE |
| 22 | 48 | 48 |
| 36 | 69 | 69 |
| 38 | 41 | 41 |
| 40 | 23 | 23 |
| 42 | 12 | 12 |
| 44 | 12 | 12 |
| 46 | 52 | 52 |
| 48 | 54 | 54 |
| 50 | 54 | 54 |
| 52 | 50 | 50 |
| 84 | 41 | 41 |
| 86 | 37 | 33 |
| 88 | 33 | 37 |
| 108 | 40 | 40 |
| 110 | 44 | 48 |
| 112 | 48 | 44 |
| 202 | 46 | 42 |
| 204 | 17 | 19 |

*Fig. 9*

MANUAL CONTROL FOR EXTENDED RANGE SPLITTER TYPE COMPOUND TRANSMISSION

RELATED APPLICATIONS

This application is related to pending British Patent Applications 8726222 filed Nov. 7. 1987; 8722186 filed Sept. 21. 1987 and U.S. patent application Ser. No. 227.031 filed Aug. 1. 1988 now U.S. Pat. No. 4,876,924.

BACKGROUND OF THE INVENTION

1. Field of the Invention

This invention relates to a control for a manually shifted compound transmission of the splitter type and more particularly to a control for compound splitter type transmission having a main section, preferably with an even number of forward speed ratios and a single reverse speed ratio, a splitter type auxiliary section and a selectively engagable and disengagable extended range section for providing increased ratio coverage in the low speed ratios.

The control utilizes the unused leg of a standard H-type shift pattern to cause the extended range section to be engaged to provide an additional gear reduction in the low speed ratio of the main transmission section and, except for one main section clutch, is utilized with the same, or substantially the same, main and auxiliary transmission section components as a standard (non-extended range) compound splitter type transmission. Also, the control maintains the standard progressive movement of the lever on the entire H-type shift pattern.

2. Description of the Prior Art

Compound change gear transmissions comprising a multiple speed main transmission section connected in series with one or more multiple speed auxiliary transmission sections are well known in the prior art. Such transmissions are usually utilized with heavy duty vehicles and are of the splitter type or the range type or a combination thereof, as may be seen by reference to U.S. Pat. Nos. 3,105,395; 3,648,546; 3,799,002; 3,921,469; 3,924,484; 2,932,988 and 3,229,551, the disclosures of which are all hereby incorporated by reference.

The control of the present invention is particularly well suited for use in connection with a compound splitter type change gear transmission of the semi-blocked type as disclosed in European Pat. No. 0071353, the disclosure of which is hereby incorporated by reference. Briefly, such a semi-blocked transmission is sold by the Assignee of this invention, Eaton Corporation, and its British subsidiary, Eaton Limited, under the trademark "Twin-Splitter" and comprises a multiple speed main transmission section connected in series with a blocked splitter type auxiliary transmission section.

While semi-blocked splitter type compound change gear transmissions are very well received, there has been, for certain applications, a need for extended low speed ratio coverage and/or for structure allowing the use of an auxiliary section countershaft PTO (i.e. "power take off" device). These drawbacks of the prior art are overcome or minimized by the provision of an extended range section which is utilized with an otherwise substantially standard semi-blocked splitter type compound transmission and provides extended low speed ratio coverage for the transmission and/or allows the transmission output shaft to be selectively, drivingly disconnected from the auxiliary transmission section countershaft thereby allowing the use of an auxiliary countershaft driven PTO.

The above is accomplished in an otherwise substantially standard semi-blocked splitter type compound transmission by rotationally fixing the auxiliary section output gear to a sleeve shaft which sleeve shaft is independently rotatable of both the transmission mainshaft and the transmission output shaft. An extended range section countershaft gear is rotatable driven by the auxiliary section countershaft and is constantly meshed with an extended range section output shaft gear which surrounds but is independently rotatable relative to the transmission output shaft. An extended range section clutch means is provided having three selectable positions. In the first position, the range section clutch will drivingly connect the sleeve shaft to the output shaft to provide standard splitter type auxiliary transmission section operation. In the second position of the range section clutch, the clutch permits independent rotation between the sleeve shaft, the output shaft and the range section output shaft gear whereby the auxiliary section countershaft(s) can be driven independently of the output shaft for auxiliary section countershaft PTO purposes. In the third position of the range section clutch, preferably only permitted in the low gear ratio position of the main transmission section, the range section output shaft gear is rotationally fixed to the output shaft and the sleeve shaft is rotatably independent of the output shaft providing a multiple deep reduction range depending upon the engaged one of the splitter section mainshaft gears.

While such an extended range splitter type transmission is highly advantageous, the requirement for operation of a separate extended range selector switch in addition to operation of the auxiliary section selector and the shift lever could complicate manual operation of such transmissions.

Controls responsive to shift lever position for shifting the auxiliary sections of range type transmissions and/or two-speed axles connected in series with simple transmissions are known in the prior art as may be seen by reference to U.S. Pat. Nos. 4,455,883 and 4,275,612, the disclosures of which are incorporated by reference. These controls were not suited for control of splitter type compound transmissions in general nor for control of an extended range section connected in series with a splitter type auxiliary transmission in particular, did not without extensive modification retain the H-type shift pattern progression and/or tended to require complicated and/or expensive modifications to the shift tower/shift bar housing assemblies.

SUMMARY OF THE INVENTION

In accordance with the present invention, a control is provided which simplifies selection of extended low range operation of a manually shifted extended low range splitter type compound transmission having, preferably, an even number of selectable forward speed main section ratios and a single main section reverse ratio.

The above is accomplished by providing an additional jaw clutch for engagement of the low speed ratio, which clutch is engaged when extended low range operation is desired by positioning the shift lever into a normally unused position of the well known "H" pattern. A sensor is provided for sensing selection of engagement/disengagement of the additional main section clutch for operation of the clutch device associated with the extended range gearing.

Accordingly, it is an object of the present invention to provide an easily operated control for a new and improved manually shifted splitter type compound transmission having an extended range section providing extended ratio coverage and/or allowing the use of auxiliary section countershaft driven PTO devices.

This and other objects and advantages of the present invention will become apparent from a reading of the detailed description of the preferred embodiment taken in connection with the attached drawings.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above-mentioned patents and reference is therefore made thereto for such details.

Figure 1:
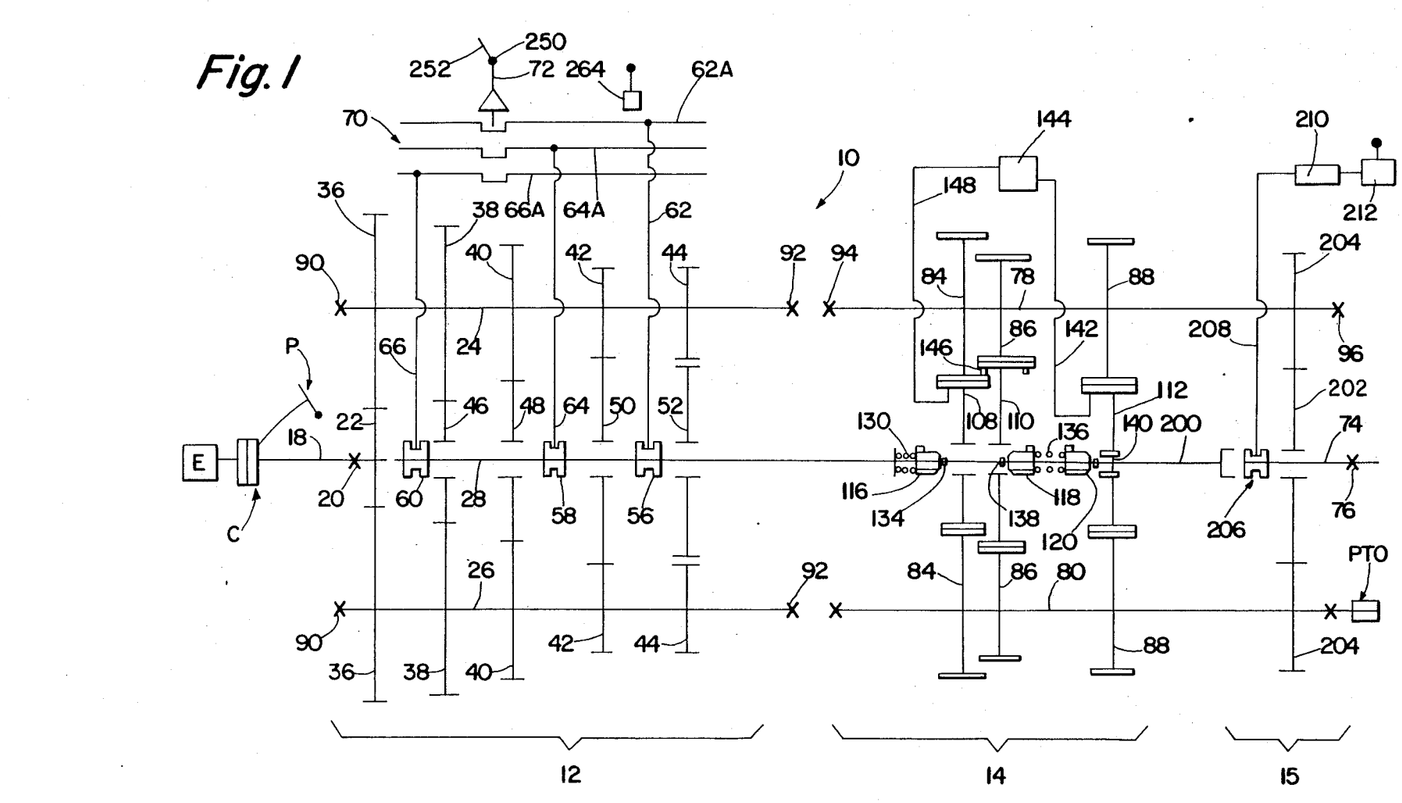
FIG. 1 is a schematic illustration of a transmission comprising a 12-speed splitter type compound transmission having an extended range section connected in series therewith and controls according to the present invention therefor.

Certain terminology will be used in the following description for convenience in reference only and will not be limiting. The wards "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission", is used to designate a transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission or section thereof, i.e., that set for gears having the highest ratio of reduction relative to the input shaft of the transmission.

The term "blocked transmission" or "blocked transmission section" shall designate a change gear transmission or transmission section wherein a selected gear is nonrotatably coupled to a shaft by means of a positive clutch and a blocker is utilized to prevent such engagement until the members of the positive clutch are substantially synchronous, such synchronous condition achieved by manual and/or automatic manipulation of the transmission input and/or output shafts to cause a crossing of synchronous condition therebetween but not achieved by frictional contact of the selected clutch members sufficient to cause one of the clutch members, and the apparatus associated therewith, to rotate with the other clutch members.

Insofar as concerns the integration of the relatively nondeformable blockers into the shiftable change speed auxiliary transmission system of the present invention, the blockers are placed between the two relatively axially slidable portions, or members, of at least one and preferably most or all of the auxiliary transmission section positive clutches and the usual friction means are provided for causing the blockers to tend to rotate with one of said members as the clutch members respectively move toward each other during a clutching procedure. One of such clutch members is often formed integrally with a mainshaft gear as internal clutch teeth thereof. As the clutching procedure occurs, the blocker limits such relative axial movement until substantial synchronization between the clutch members involved in a given shift is sensed.

The blockers of the present invention, and the other clutch elements of a given clutchable pair of clutch members, are typically provided with complementary angling leading spaces or ramps on the blocker teeth or members thereof to tend to, under the influence of the spring bias, cause an unblocking when the mainshaft is otherwise unconnected to any other mainshaft gears and hence at a minimum inertia. The angling of said blocker teeth is, however, insufficient to effect unblocking during a normal shift and hence will not interfere with the required blocking function during a normal shift. It has been found that complementary ramp angles of about 15°–25°, preferably about 20°, provide satisfactory operation when used in connection with normally encountered spring forces and clutch inertias. As may be seen by reference to U.S. Pat. No. 3,921,469 and 3,924,484, both above mentioned, there may further be provide means by which a significant axial drag with a minimum of rotational drag is provided constantly between the blocker ring and the clutch member blocked thereby. Thus, said blocker rings will be axially urged upon axial movement of said last named clutch element into engagement with the driving cone of the other clutch element and will thereby be held in proper position against the effect of its own inertia with respect to the gear associated therewith. This assures that, in most operating situations, the blocker rings will be in the desired position prior to contact with the blocking surface of the clutch.

Compound transmissions, especially of the splitter type, are usually designated by an "A×B" notation wherein:

A=the number of selectable forward speeds or power paths in the main transmission section;

B=the number of selectable speeds or power paths in the auxiliary transmission section; and A×B =the total number of available forward transmission speeds.

Accordingly, a twelve speed splitter type compound transmission could be a "6×2", a "4×3", a "3×4" or a "2×6".

The term "H" shift pattern is intended to cover shift patterns of the well known H type including single H, and one-and-a quarter H, double H and similar shift patterns.

Figure 2:
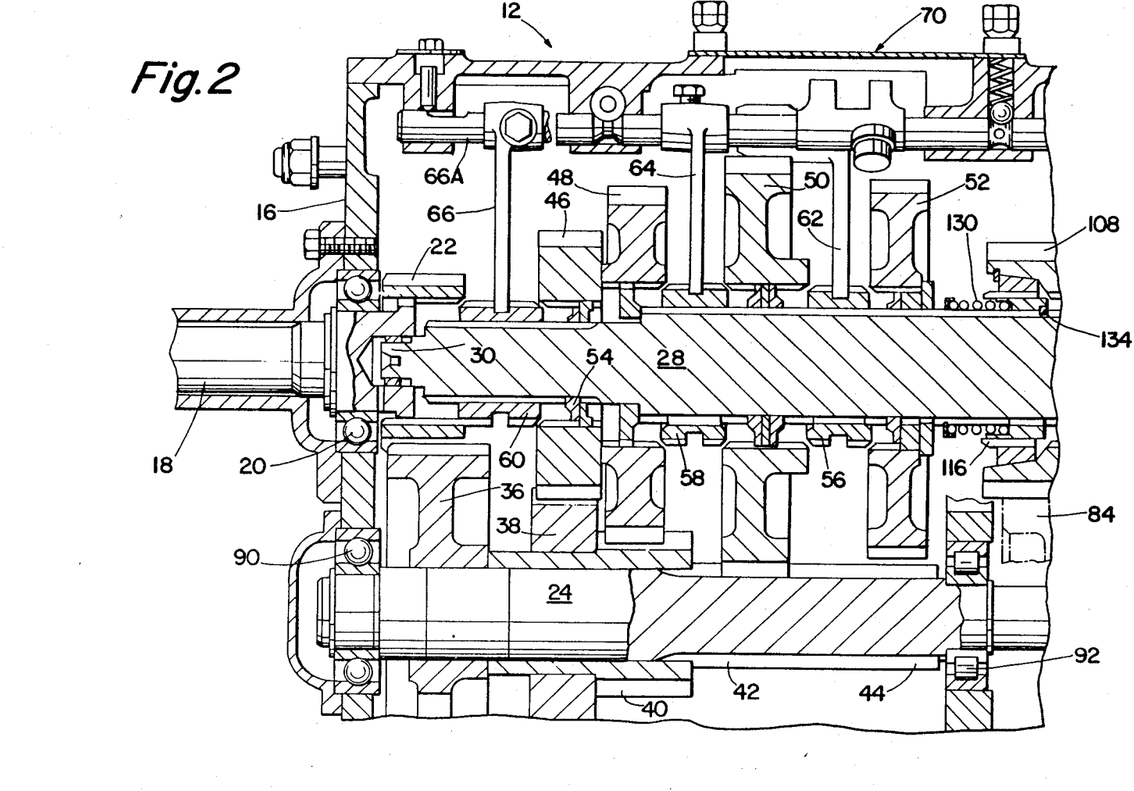
FIG. 2 is a partial sectional view of the transmission and control of FIG. 1.

Referring now to FIGS. 1 and 2, there is illustrated a "4×3" 12-forward speed, semi-blocked splitter type compound transmission having an extended range portion attached in series thereto and a control mechanism therefor. Transmission 10 comprises a main section 12 connected in series with an auxiliary section 14 which is connected in series with an extended range section 15, each of which have a plurality of selectable speeds or power paths. The main, auxiliary and extended range sections are all suitably enclosed by conventional housing means 16.

The transmission 10 includes an input shaft 18 supported adjacent its rearward end by a bearing 20 and is provided with an input gear 22 non-rotatably connected thereto, as by splines. The input gear 22 simultaneously drives a plurality of main section countershafts at equal speeds. In the illustrated embodiment, the transmission is provided with two main section countershafts, 24 and 26, disposed on diametrically opposite sides of the mainshaft 28, which mainshaft is coaxially aligned with the input shaft 18 and is provided with a pilot portion 30 on its forward end rotatably received within and supported by the rearward end of the input shaft 18.

The input shaft 18 is normally driven in one direction only by a prime mover, such as a throttle control Diesel engine E through a selectively operated, normally engaged, friction master clutch C. Clutch C may be selectively disengaged by used of pedal P, as is known in the prior art. Clutch C may have a known clutch brake associated therewith.

Each of the main section countershafts 24 and 26 is provided with an identical grouping of countershaft gears, 36, 38, 40, 42 and 44 thereon, which groupings form pairs of gears, such as the pair of gears 36, of identical size and number of teeth and disposed on diametrically opposite sides of the mainshaft 28. As may be seen by reference to FIG. 2, countershaft gears 42 and 44 may be defined by involute splines formed directly on the main section countershafts.

A plurality of main section mainshaft drive gears 46, 48, 50 and 52 surround the mainshaft 28 and are selectably clutchable thereto, one at a time, by sliding clutch collars as is well known in the art.

The main section mainshaft gears 46, 48 and 50 encircle the mainshaft 28, are in continuous meshing engagement with, and are floatingly supported by the diametrically opposite pairs of countershaft gears 38, 40, and 42, respectively, which mounting means and the special advantages resulting therefrom are explained in greater detail in U.S. Pat. Nos. 3,105,395 and 3,335,616, both assigned to the assignee of this application and hereby incorporated by reference. The mainshaft gear 52 is the reverse gear and is in continuous meshing engagement with a pair of countershaft gears 44 by means of conventional intermediate idler gears (not shown). The forwardmost countershaft gears 36 are continually meshed with and driven by the input gear 22 for causing simultaneous rotation of the countershafts 24 and 26 whenever the input shaft is rotatably driven.

Main section mainshaft gears 46, 48, 50 and 52, and main section countershaft gears 36, 38, 40, 42 and 44, and the idler gears, are all constantly meshed with and driven by the input gear 22 and thus, in combination, form the input gearing of the transmission 10.

As may be seen, various abutment rings 54 are provided to axially fix the main section mainshaft gears relative to mainshaft 28.

Sliding clutch collars 56, 58 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars, or rails, 62A, 64A and 66A respectively of a know shift bar housing assembly 70 which is operated by a conventional shift lever 72. The present invention is also applicable to transmissions utilizing a remote mechanical, electrical or fluid shift machanism in place of shift bar housing 70 and shift lever 72.

Considering now the splitter auxiliary section 14, the mainshaft 28 extends thereinto and is coaxially arranged with and piloted into an output shaft 74 which is in turn supported within the housing 16 by suitable bearings generally indicated at 76. Said auxiliary section further includes a plurality of auxiliary section countershafts 78 and 80 each having an identical grouping of countershaft gears 84, 86 and 88 thereon.

As is known in the art and is illustrated in above mentioned U.S. Pat. No. 3,105,395, to minimize the axial and transverse dimensions of a twin countershaft type compound transmission, the mainshaft section countershafts, 24 and 26, are displaced about 42° from the auxiliary section countershafts. Main section countershafts are supported in housing 16 by bearings 90 and 92 while auxiliary section countershafts, 78 and 80, are supported in housing 16 by bearings 94 and 96.

Two auxiliary section mainshaft gears, 108 and 110 encircle the mainshaft 28 and are constantly meshed with and floatingly supported by the auxiliary countershaft gear pairs 84 and 86, respectively. Output gear 112 is splined to a sleeve shaft 200 for axial movement relative thereto and rotational movement therewith. Output gear 112 is constantly meshed with auxiliary countershaft gear pair 88.

Resiliently biased clutch members 116, 118 and 120 are splined to mainshaft 28 and, in combination with blockers (shown in FIG. 5) 124, 126, 128, respectively, provide resilient, blocked clutching apparatus of the type described in U.S. Pat. Nos. 3,799,002, 3,921,469 and 3,924,484 for selectively clutching gears 108, 110 and 112, respectively, one at a time, to mainshaft 28. Clutch 116 is biased axially rightwardly by spring 130 and limited in axial movement by positive stop 134. Clutch members 118 and 120 are biased axially apart by spring 136 surrounding the mainshaft and limited in axial movement by stops 138 and 140.

Output gear 112 axial movement is by shift fork 142, movable by shift cylinder assembly 144. Mainshaft gears 108 and 110 are jointed for joint axial movement and independent rotation by ring 146 and are axially movable by shift fork 148 movable by the shift cylinder assembly. The shift cylinder assembly 144 defines a remote servo mechanism by which gears 108, 110 and 112 are selectively engaged, one at a time, to mainshaft 28. Of course, engagement of gear 112 to the mainshaft 28 is effective to couple mainshaft 28 directly to the sleeve shaft 200.

The extended range section 15 of transmission 10 includes extended range output shaft gear 202 which surrounds output shaft 74 and is rotatable relative thereto. The extended range output shaft gear 202 is in constant mesh with and supported by extended range countershaft gears 204 supported by and fixed for rotation with the auxiliary section countershaft assemblies 78 and 80. An extended range section clutch 206 is splined to the output shaft 74 for rotation therewith and axial movement relative thereto. Range section clutch 206 is axially positioned by means of a shift fork 208 controlled by a three position piston and cylinder assembly 210. Assembly 210 is controlled by controller 212 which may be a solenoid controlled valve or the like.

Figure 5:
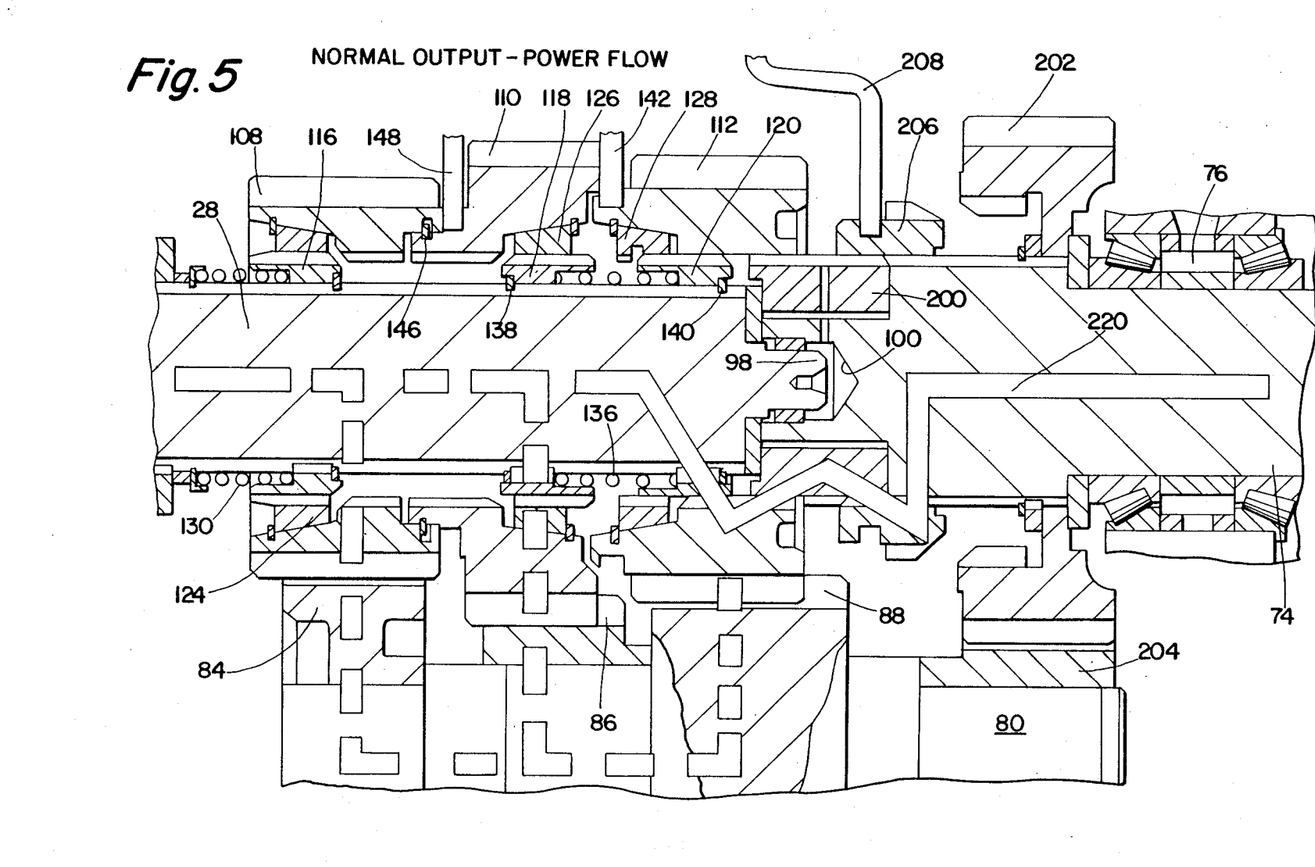
FIG. 5 is an enlarged partial sectional view of the auxiliary and extended range sections of the transmission of FIG. 1 illustrating the normal output power flow with the range section clutch in the first position thereof.

Referring to FIG. 5, the extended range clutch 206 is in its first or leftwardmost position causing the sleeve shaft 200 to be rotatably fixed to output shaft 74 and range section output gear 202 to be rotatably independent of output shaft 74. In this condition, the extended range section 15 provides a direct drive between the sleeve shaft 200 and the output shaft 74 of the transmission 10. The power flow, as illustrated by solid line 220, is in effect a lock-up or bypass of the extended range section 15 wherein the transmission gear ratios are those ratios provided by sections 12 and 14 only. In this position, the transmission 10 operates substantially identically as the transmissions illustrated in European Pat. No. 0071353.

Figure 6:
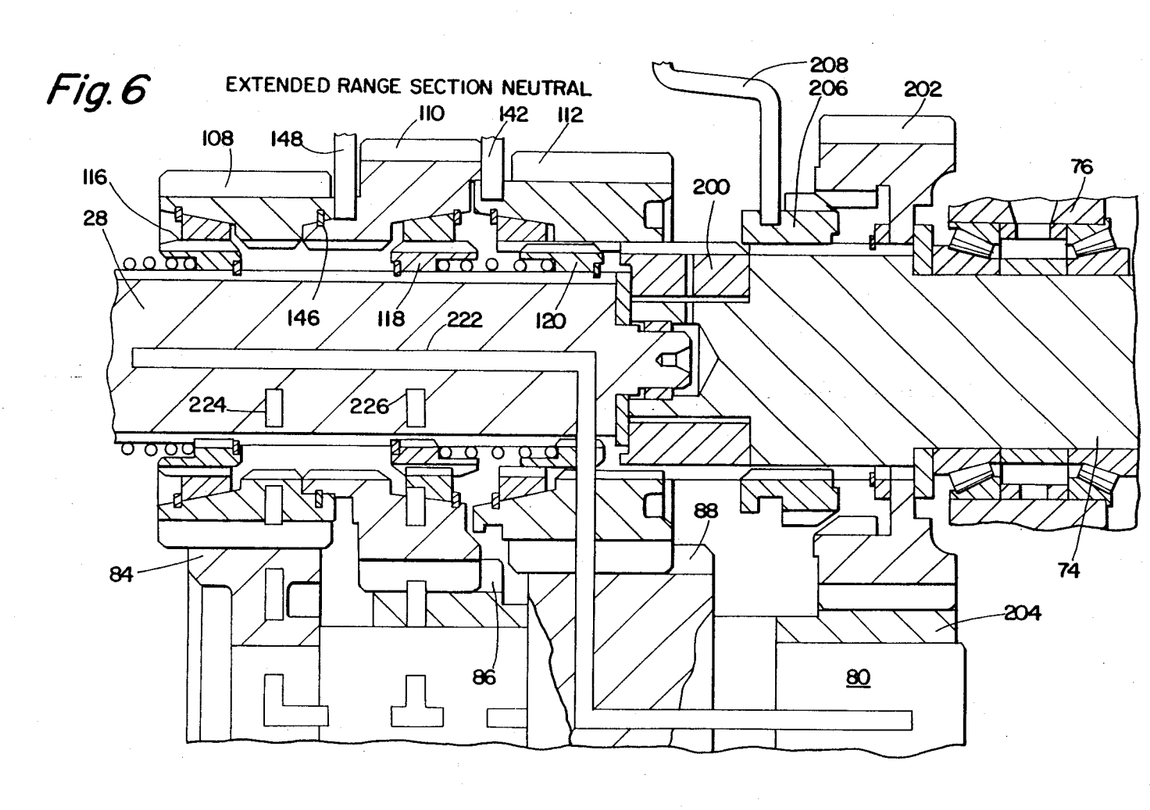
FIG. 6 is a view similar to FIG. 5 illustrating the extended range section neutral position allowing use of an auxiliary section countershaft PTO with the range section clutch in the second position thereof.

Referring to FIG. 6, the range section clutch 206 is in the second or axially intermediate position, wherein the sleeve shaft 200 is rotatably independent of the output shaft 74 and the range section output gear is rotatably independent of the output shaft 74. In this condition, assuming a main section gear is engaged to the mainshaft 28 and one of the auxiliary section gears 108, 110 or 112 is also engaged to the mainshaft 28, the auxiliary section countershafts 78 and 80 will be driven by the input shaft 18 independently of any drive to the output shaft 74. Solid line 222 illustrates the power flow to the auxiliary section countershaft 80 with output gear 112 clutched to the mainshaft 28 by means of clutch 120. This condition is, of course, useful for driving a PTO with a vehicle in the stopped condition. Dotted lines 224 and 226 indicate that alternate gear ratio power paths may be selected for powering the auxiliary countershaft PTO.

Figure 7:
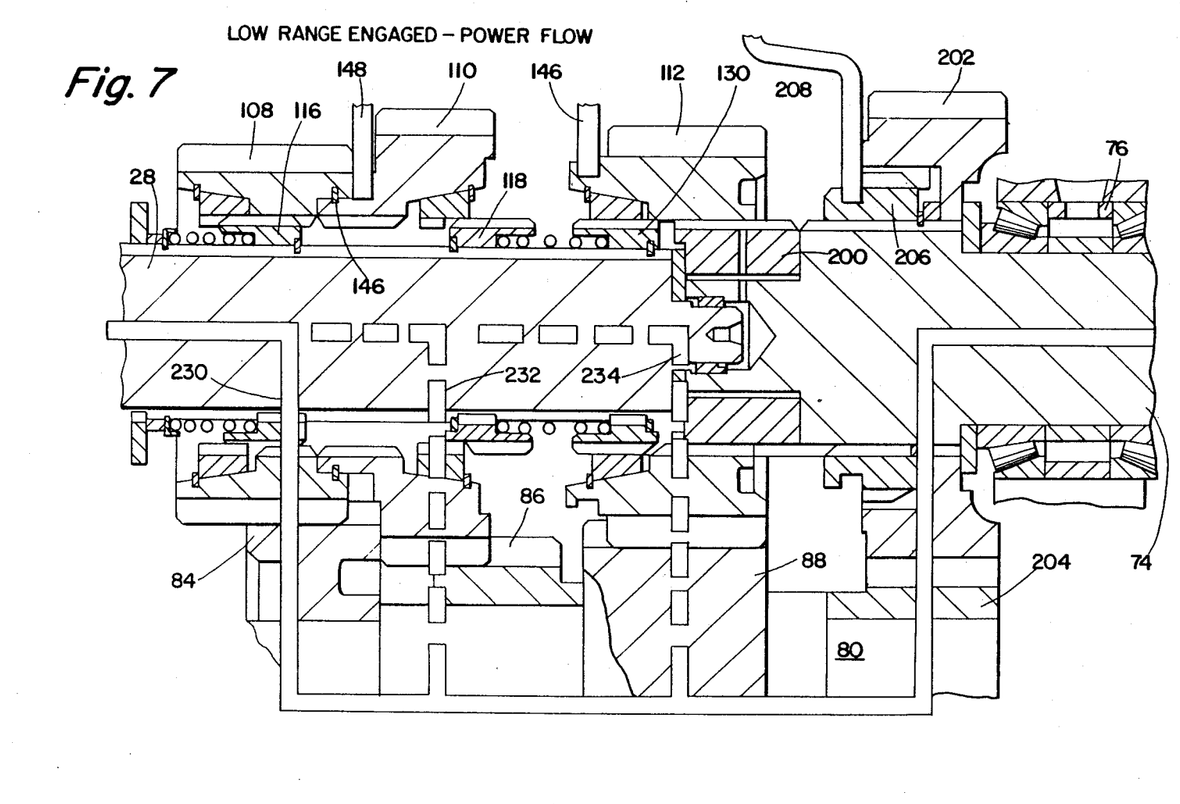
FIG. 7 is similar to FIG. 5 illustrating the low range engaged power flow with the extended range clutch in the third position thereof.

Referring to FIG. 7, range section clutch 206 is in its third or rightwardmost position. In this position, sleeve shaft 200 is independently rotatable relative to output shaft 74 and range section output gear 202 is rotatably fixed to output shaft 74. In this condition, as illustrated by solid line 230 and dashed lines 232 and 234, the power flow through the transmission is through the mainshaft 28 to whichever of the auxiliary section mainshaft gears, 108, 110 or 112, is clutched to the mainshaft to the auxiliary section countershaft 78 and 80, through range section countershaft gears 204 and range section output shaft gear 202 and output shaft 74. Preferably, the third position for range section clutch 206 is selected or selectable only when the main transmission section is engaged in its lowest gear ratio, i.e. when main section mainshaft gear 50 is clutched to mainshaft 28 by means of clutch 56. Extended range section gears 202 and 204 are selected such that the ratio between the number of teeth on gear 202 relative to the number of teeth on gear 204 is greater than the ratio of the number of teeth on gear 110 relative to the number of teeth on gear 86 whereby a greater ratio is provided with the range section clutch in the third rather than the first position thereof.

Figure 8:
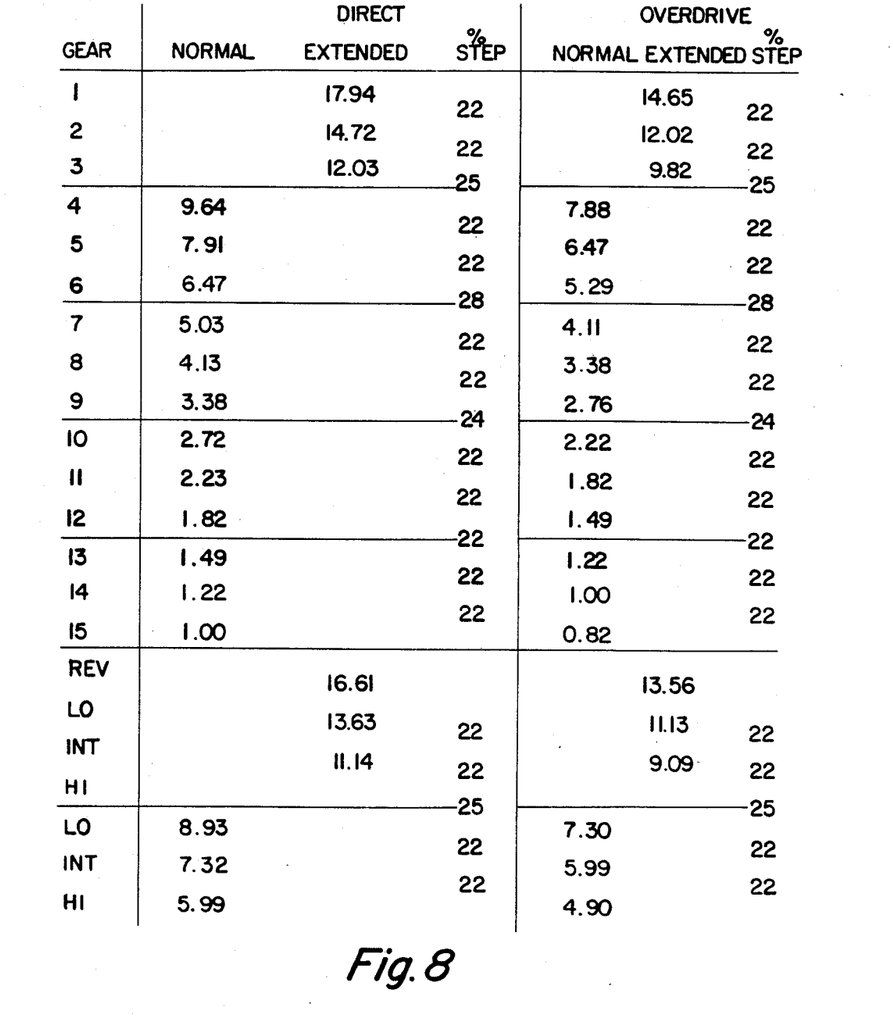
FIG. 8 is a table illustrating the ratios available in a typical transmission of the type illustrated in FIG. 1.
Figure 9:
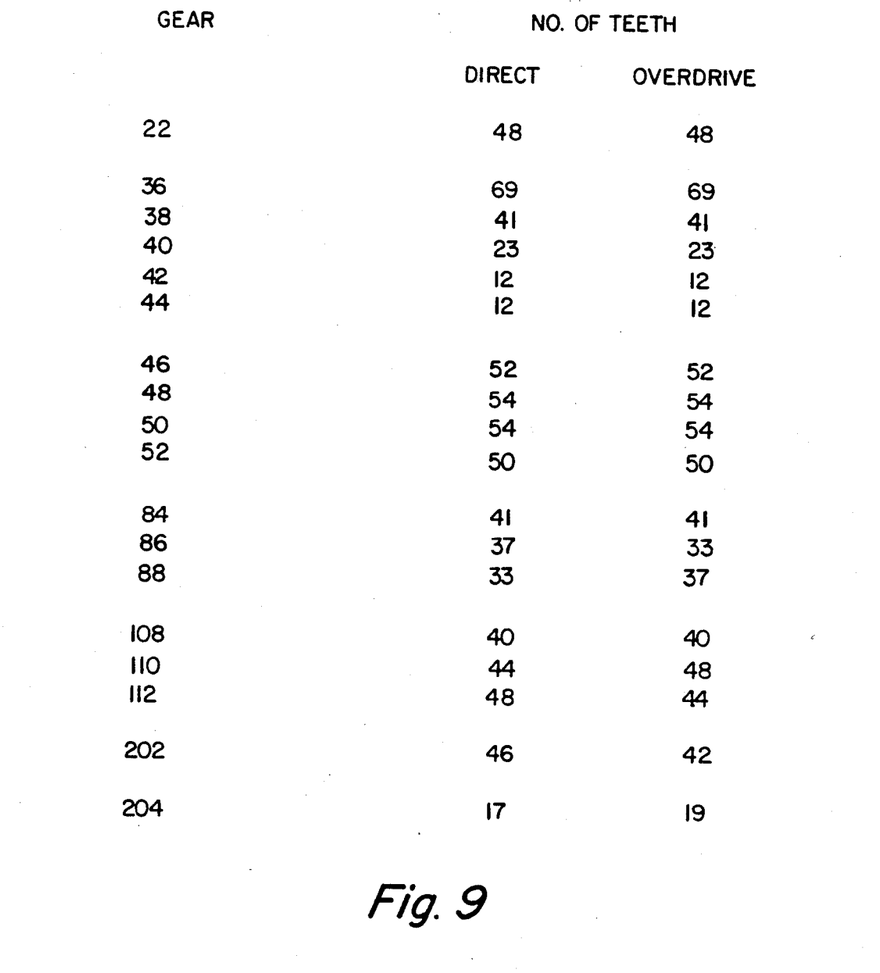
FIG. 9 is a gear chart.

Referring to FIG. 8, the ratios available in a typical transmission of the type illustrated in FIGS. 1 and 2 are indicated. Briefly, the ratios 1, 2 and 3 are those ratios available by utilizing the extended low range engaged as illustrated in FIG. 7 while the ratios 4 through 15 are those ratios available with the range section locked up as illustrated in FIG. 5. The available ratios are indicated for both a standard ("TS ratios") and an overdrive ("TSO ratio") types of transmissions. As may be seen by reference to FIGS. 3 and 8, transmission 10 may be considered a "4×3+3" fifteen forward speed transmission.

Figure 3:
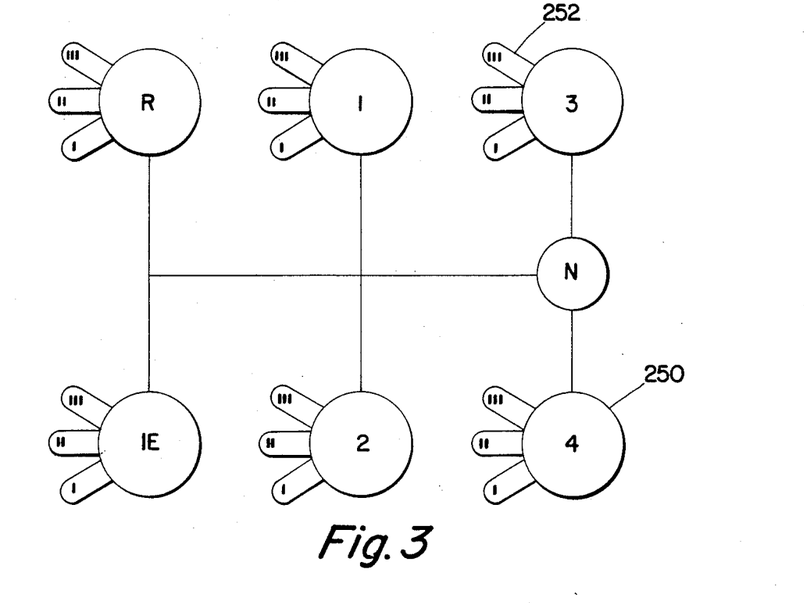
FIGS. 3 and 3A are schematic illustrations of the shift pattern and corresponding ratio pattern of the transmission of FIG. 1
Figure 3A:
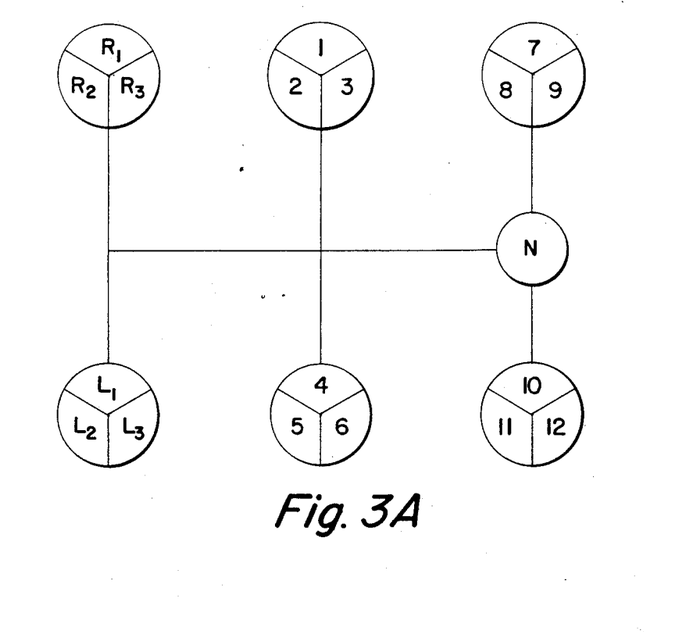

The shift pattern and ratio pattern for transmission 10 provided by the control of the present invention is illustrated in FIGS. 3 and 3A. It is noted that only in the low gear position for the main transmission section are the ratios provided by the extended range sections available. By the use of modified controls and/or gearing, extended range operation may also be available for reverse operation.

Control of the servomechanism 144 is by control means, such as selector knob 250 illustrated in FIGS. 1 and 3. The master control selector knob 250 will be attached to the gear shift lever. Typically, the master control selector knob 250 may include a movable member, such as button 252, or some other toggle mechanism, having three unique positions ("Lo", "Int" and "Hi" or "I", "II" and "III") by which any one of the auxiliary section power paths, or speeds may be selected. The master control selector knob 250 may include a second movable member having two unique positions ("D", "PTO") by which the drive condition or the auxiliary countershaft PTO condition for transmission 10 may be selected.

Typically, the master control 250 and the servomechanisms 144 and 210 are fluid and/or electrically operated and suitable master/slave valving and/or circuitry is provided. Controls of this type are well known in the prior art and may be seen by reference to U.S. Pat. No.

4,555,959; the disclosure of which is hereby incorporated by reference.

Figure 4:
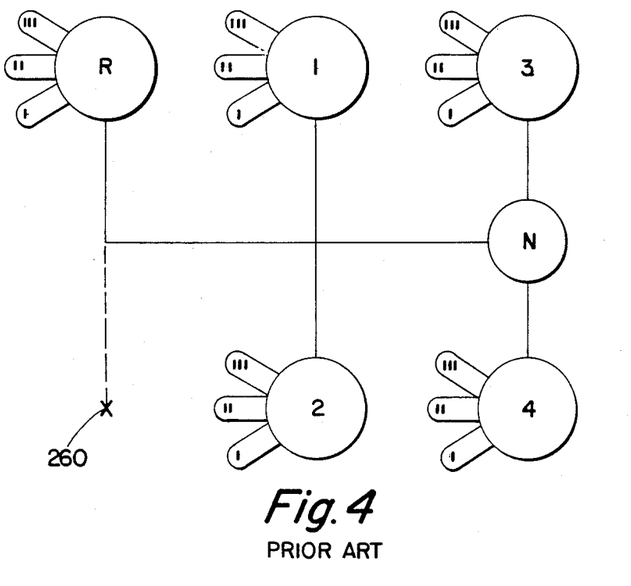
FIGS. 4 and 4A are schematic illustrations of typical prior art transmission shift patterns and corresponding ratio patterns.
Figure 4A:
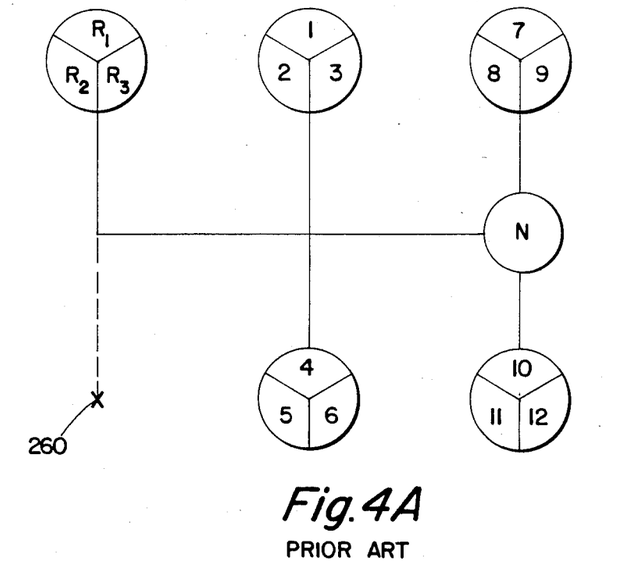

As may be seen by comparing the shift and ratio patterns of the present invention (see FIGS. 3 and 3A) to the shift and ratio patterns of the prior art (see FIGS. 4 and 4A) for a typical 4×3 twelve speed splitter type compound transmission, the control of the invention allows extended low range (i.e., deep reduction) operation to be selected by shifting lever 72 to the unused leg 260 of the prior art shift pattern. Accordingly, extended range operation is easily selected without requiring an additional selector switch operation by the vehicle operator and maintaining the standard H type shifting pattern progression.

Referring to FIGS. 1 and 2, clutch collar 56 and gear 50 are modified relative to prior art devices such that gear 50 can be selectively clutched to shaft 28 by either clutch 58 or clutch 56. In the prior art, clutch 56 could only clutch the reverse gear 52 to mainshaft 28 and gear 50 was clutchable to mainshaft 28 only be means of clutch 58.

In addition to the modifications to clutch 56 and gear 50, a sensing means, such as sensor 264, is providing for sensing movements of clutch 56, shift rail 62A and/or shift fork 62 to engage/disengage gear 50 to shaft 28 by clutch 56 to provide operating signals to the extended range clutch operators 210/212 of the vehicle operator's desire to engage/disengage the extended low range. Based upon the signals from sensor 264 the extended clutch 206 will be positioned in either the first or third positions thereof. As indicated above, a separate PTO selection switch may be provided for selectively positioning the extended range clutch 206 in the second position thereof.

While the control of the present invention is especially well suited for controlling extended range splitter type compound transmissions having an even number of selectively engaged forward ratios in the main sections thereof, it is understood that by use of modified clutches, shift rails, shift fork and/or gearing, a shifting pattern using the control of the present invention may be provided wherein an added or redundant shift lever position will allow simplified manual selection, preferably in H shift pattern format, of extended range operation in the highest, lowest and/or reverse modes of operation.

In view of the above, it may be seen that by addition of a relatively simple extended range section to relatively standard components of a splitter type compound transmission, a splitter type compound transmission is provided having extended ratio coverage or low speed operation thereof, in both the forward and reverse directions thereof, and/or allowing the use of auxiliary transmission section countershaft driven PTO devices usable with the vehicle in the stationary condition thereof. As an alternative, a top end (high speed) extended range section may be utilized to provide extended ratio coverage in the overdrive ratios.

By use of modified clutch and/or shift bar housing structure, an added or redundant position in the standard H pattern for easily selecting extended range operation of the transmission is provided.

Although the present invention has been described in terms of what it is at present believed to be its preferred embodiment, it will be apparent to those skilled in the art that various changes may be made without departing from the spirit and the scope of the invention as hereinafter claimed.

I claim:
1. A control for an extended range compound splitter type change gear transmission (10) comprising a housing (16) defining a multiple speed main transmission section (12) connected in series with a multiple speed auxiliary transmission section (14) connected in series with a two speed extended range section (15) defining a first 1:1 ratio and a second speed reduction ratio;

said control comprising a first selector including a shift lever (72) movable in an H-type pattern having a plurality of first positions (1, 2, 3, 4, R) for selecting a main transmission section speed ratio and a second selector (252) for selection of an auxiliary transmission section speed ratio;

said control characterized by said first selector (72) having a second position (1E) for selection of a lowest forward speed main transmission section speed ratio (1st) selectable in one of said first positions (1), said second position located on the opposite side of the neutral (N) position of said H-type pattern from said one of said first positions and sensor means (264) for sensing engagement and disengagement of said lowest forward speed main transmission section speed ratio by movement of said first selector to and from said second position to cause an extended range shifting mechanism (210, 212) to cause said extended range section to shift from said first to second and from said second to first extended range section speed ratio.

2. The control of claim 1 wherein said H-type pattern defines a plurality of substantially parallel legs and said second position (1E) is located on the same leg of the H-type pattern as the first position associated with selecting reverse operation (R).

3. A control for an extended range compound splitter type change gear transmission (10) comprising a housing (16) defining a multiple speed main transmission section (12) connected in series with a multiple speed auxiliary transmission section (14) connected in series with a multiple speed extended range section (15);

said main transmission section (12) comprising an input shaft (18) having an input gear (22) rotationally fixed thereto, a mainshaft (28) generally coaxial with said input shaft in extended into said auxiliary transmission section at least one countershaft (24, 26) rotationally supported in said housing and driven by said input gear, a plurality of countershaft gears (36, 38, 40, 42) fixed to said countershaft, a plurality of main section mainshaft gears (46, 48, 50) surrounding but not constantly engaged with said mainshaft and constantly driven by said countershaft gears, one of said main section mainshaft gears defining a lowest main section speed ratio and another of said main section mainshaft gears defining a second lowest main section speed ratio, and main section jaw clutch assemblies (56, 58, 60) for selectively clutching said input gear and said main section mainshaft gears, one at a time, to said mainshaft;

said auxiliary transmission section (14) comprising at least one auxiliary countershaft (78, 80) rotationally supported in said housing, an intermediate shaft (200) generally coaxial with said mainshaft, said auxiliary countershaft having a plurality of auxiliary countershaft gears (84, 86 88) fixed thereto, an output gear (112) splined to said intermediate shaft for rotational movement therewith, said output gear constantly meshed with one (88) of said auxiliary countershaft gears, at least one auxiliary mainshaft gear (108, 110) surrounding said mainshaft for rotational movement relative thereto, said auxiliary mainshaft gear constantly meshed with another (84, 86) of said auxiliary countershaft gears, auxiliary section jaw clutch assemblies (116, 118, 120) for selectively coupling said auxiliary mainshaft gear and said output gear, one at a time, to said mainshaft;

said extended range section (15) comprising an output shaft (74) generally coaxial with said mainshaft and said intermediate shaft and independently rotatable relative thereto, a range section countershaft gear (204) fixed for rotation with said auxiliary countershaft (78, 80), a range section output shaft gear (202) surrounding said output shaft and independently rotatable relative thereto, and a range section clutch (206) having a first selectable position for rotationally coupling said intermediate shaft to said output shaft and allowing said range section output gear to rotate independently of said output shaft, and second selectable position for rotationally coupling said range section output shaft gear to said output shaft and allowing independent rotation between said intermediate shaft and said output shaft;

manually operated main section shifting means (72) for selectively moving said auxiliary jaw clutch assembly relative to said mainshaft;

range section shifting means (210, 212) for selectively positioning said range section clutch in a selected one of the two selectable positions thereof;

said control characterized by:

first (58) and second (56) independent main section jaw clutch assemblies for selectively clutching the lowest main section speed ratio main section mainshaft gear (50) to said mainshaft and means (264) for sensing engagement and disengagement, respectively, of said lowest main section speed ratio mainshaft gear by one (56) of said main section jaw clutch assemblies to cause said range section shifting means to cause said range section clutch to move toward said second and first positions, respectively, there of.

4. The control of claim 3 wherein said first main section clutch (58) is axially displacable in a first axial direction from a disengaged position to engage the second lowest speed ratio main section mainshaft gear (48) and in a second axial direction to engage said lowest speed ratio mainshaft gear (50) and said second main section clutch (56) is axially displacable in said first axial direction from a disengaged position to engage said low speed ratio mainshaft gear (50) and in the second axial direction to engage the reverse speed mainshaft gear (52).

5. The control of claim 4 wherein said main section shifting means includes a shift bar housing assembly (70) having a first (64A) and a second (62A) parallel adjacent shift rails carrying first (64) and second (62) shift forks fixed for axial movements with said first (58) and second (56) main section jaw clutch assemblies, respectively.

6. The control of claim 5 wherein said main section shifting means includes a shift lever (72) for imparting a selective axial movement to a selected shift rail (62A, 64A, 66A).

7. The control of claim 6 wherein said main transmission section has a single selectable reverse speed ratio and an even number of selectable forward speed ratios.

8. The control of claim 5 wherein said main transmission section has a single selectable reverse speed ratio and an even number of selectable forward speed ratios.

9. The transmission control of claim 8 characterized by the ratio of the number of teeth carried by said range section output shaft gear (202) to the number of teeth carried by the range section countershaft gear (204) is greater than the largest of the ratios of teeth carried by the auxiliary section mainshaft gears (108, 110) or the output gear (112) relative to the number of teeth carried by the auxiliary section countershaft gears (84, 86, 88, respectively) mated therewith.

10. The transmission control of claim 5 characterized by the ratio of the number of teeth carried by said range section output shaft gear (202) to the number of teeth carried by the range section countershaft gear (204) is greater than the largest of the ratios of teeth carried by the auxiliary section mainshaft gears (108, 110) or the output gear (112) relative to the number of teeth carried by the auxiliary section countershaft gears (84, 86, 88, respectively) mated therewith.

11. The transmission control of claim 3 characterized by the ratio of the number of teeth carried by said range section output shaft gear (202) to the number of teeth carried by the range section countershaft gear (204) is greater than the largest of the ratios of teeth carried by the auxiliary section mainshaft gears (108, 110) or the output gear (112) relative to the number of teeth carried by the auxiliary section countershaft gears (84, 86, 88, respectively) mated therewith.

12. A control for an extended range compound splitter type change gear transmission (10) comprising a housing (16) defining a multiple speed main transmission section (12) connected in series with a multiple speed auxiliary transmission section (14) connected in series with a multiple speed extended range section (15);

said main transmission section (12) comprising an input shaft (18) having an input gear (22) rotationally fixed thereto, a mainshaft (28) generally coaxial with said input shaft in extending into said auxiliary transmission section, at least one countershaft (24, 26) rotationally supported in said housing and driven by said input gear, a plurality of countershaft gears (36, 38, 40, 42) fixed to said countershaft, a plurality of main section mainshaft gears (46, 48, 50) surrounding but not constantly engaged with said mainshaft and constantly driven by said countershaft gears, one of said main section mainshaft gears defining a low speed ratio main section mainshaft gear and another of said main section mainshaft gears defining a second lowest speed ratio main section mainshaft gear, and main section jaw clutch assemblies (56, 58, 60) for selectively clutching said input gear and main section mainshaft gears, one at a time, to said mainshaft;

said extended range section (15) comprising a range section clutch (206) having a first selectable position for selecting a 1:1 ratio and second selectable position for selecting a speed reducing ratio;

manually operated main section shifting means (72) for selectively moving said main section jaw clutch assemblies relative to said mainshaft;

auxiliary section shifting means (144) for shifting said auxiliary transmission section;

range section shifting means (210, 212) for selectively positioning said range section clutch in a selected one of the two selectable positions thereof;

said control characterized by:

first (58) and second (56) independent main section jaw clutch assemblies for selectively clutching the low speed ratio main section mainshaft gear (50) to said mainshaft and means (264) for sensing engagement and disengagement of said low speed ratio mainshaft gear by one (56) of said main section jaw clutch assemblies to cause said range section shifting means to cause said range section clutch to move toward said second and first positions, respectively, thereof.

13. The control of claim 12 wherein said first main section clutch (58) is axially displacable in a first axial direction from a disengaged position to engage the second lowest speed ratio main section mainshaft gear (48) and in a second axial direction to engage said low speed ratio mainshaft gear (50) and said second main section clutch (56) is axially displacable in said first axial direction from a disengaged position to engage said low speed ratio mainshaft gear (50) and in the second axial direction to engage the reverse speed mainshaft gear (52).

14. The control of claim 13 wherein said main section shifting means includes a shift bar housing assembly (70) having a first (64A) and a second (62A) parallel adjacent shift rails carrying first (64) and second (62) shift forks fixed for axial movements with said first (58) and second (56) main section jaw clutch assemblies, respectively.

15. The control of claim 14 wherein said main section shifting means includes a shift lever (72) for imparting a selective axial movement to a selected shift rail (62A, 64A, 66A).

16. The control of claim 15 wherein said main transmission section has a single selectable reverse speed ratio and an even number of selectable forward speed ratios.

17. The control of claim 14 wherein said main transmission section has a single selectable reverse speed ratio and an even number of selectable forward speed ratios.

* * * * *